Figure 1:
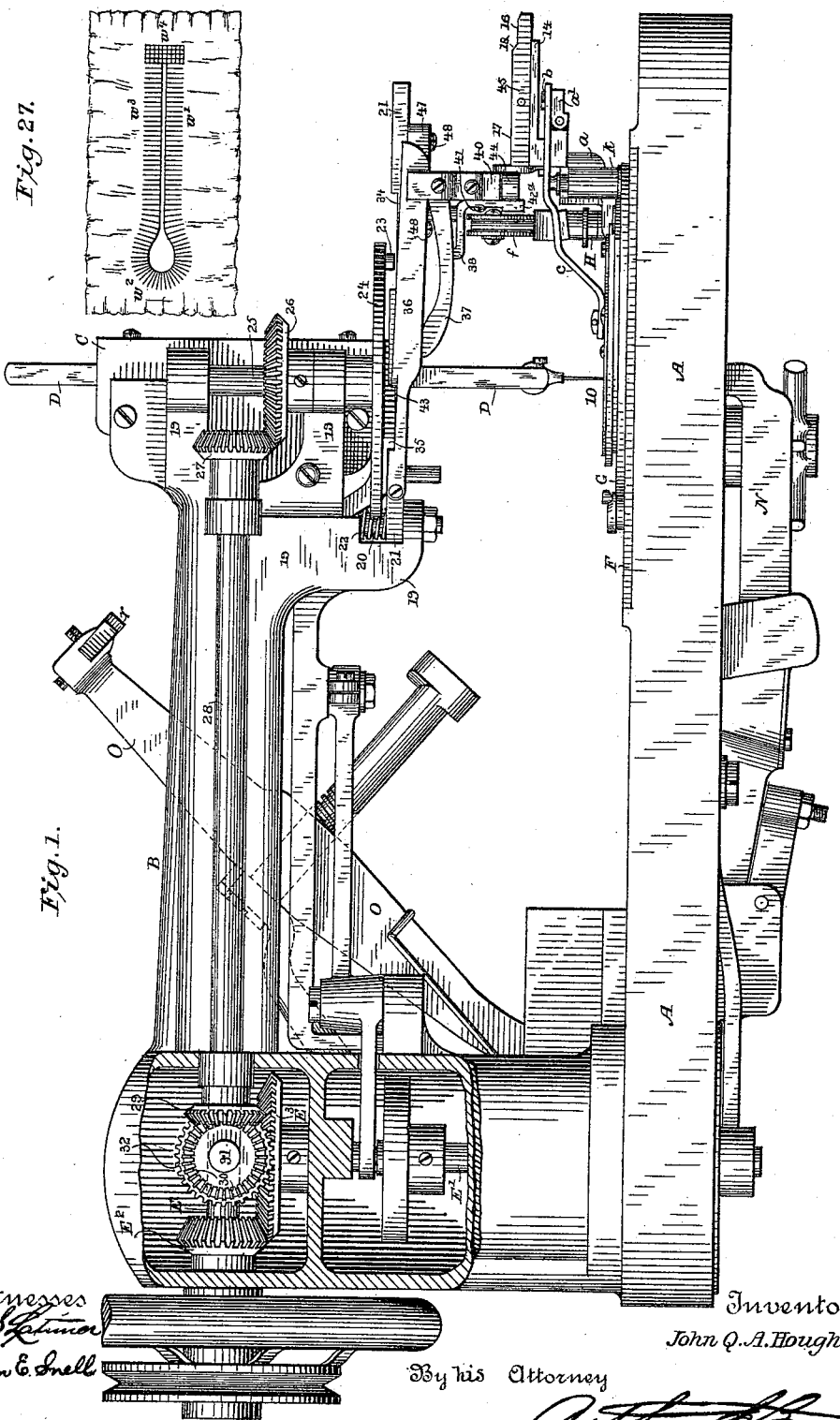

(No Model.)  9 Sheets—Sheet 3.

J. Q. A. HOUGHTON.
BUTTON HOLE SEWING MACHINE.

No. 438,812.  Patented Oct. 21, 1890.

(No Model.) 9 Sheets—Sheet 4.
J. Q. A. HOUGHTON.
BUTTON HOLE SEWING MACHINE.
No. 438,812. Patented Oct. 21, 1890.
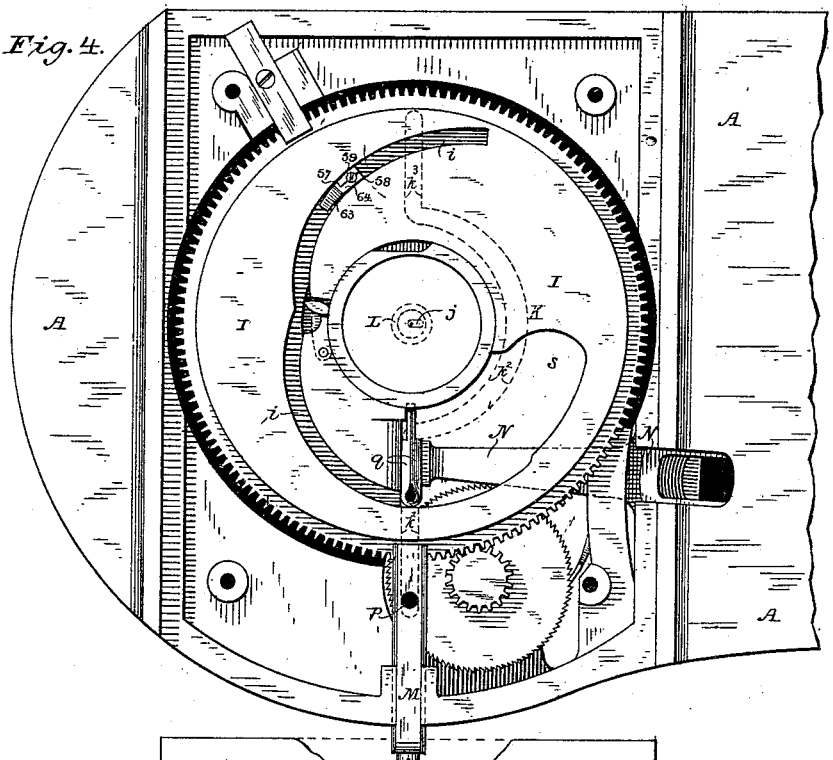
Fig. 4.
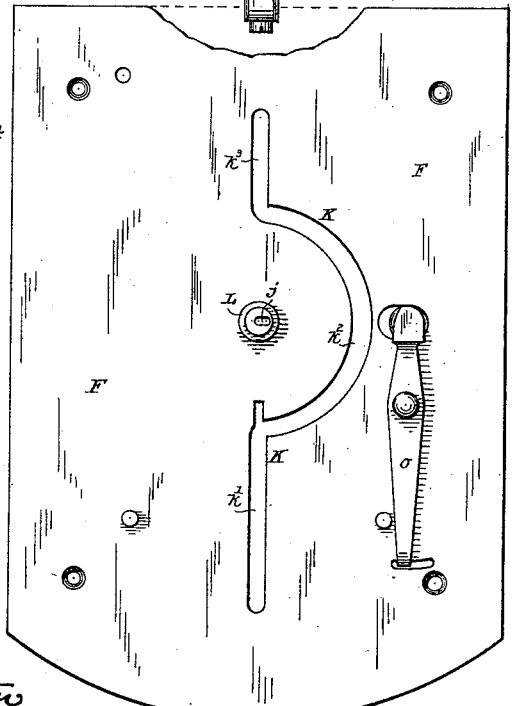
Fig. 4ª
Witnesses
Jos. S. Latimer
Carleton E. Snell
Inventor
John Q. A. Houghton
By his Attorney (No Model.)  9 Sheets—Sheet 5.
J. Q. A. HOUGHTON.
BUTTON HOLE SEWING MACHINE.
No. 438,812. Patented Oct. 21, 1890.
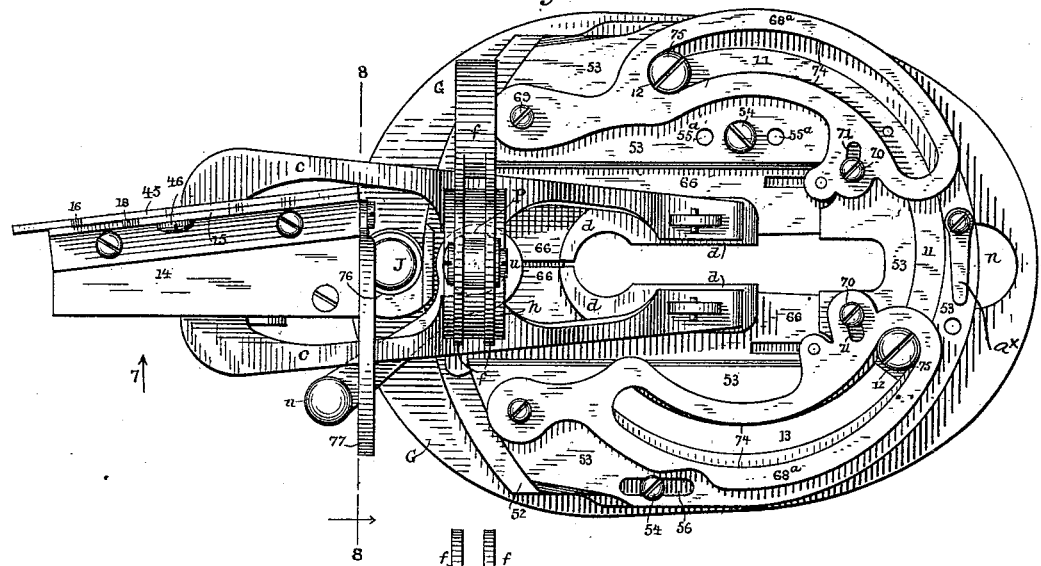
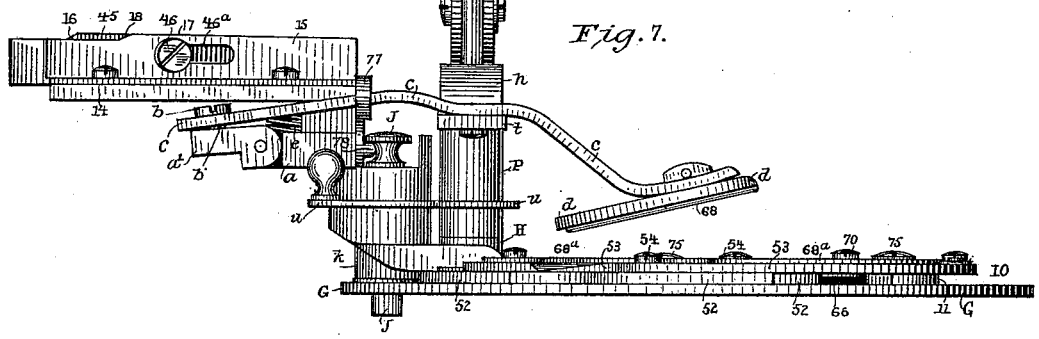
Witnesses
Jos. S. Latimer
Carleton E. Snell
Inventor
John Q. A. Houghton
By his Attorney (No Model.) 9 Sheets—Sheet 6.
J. Q. A. HOUGHTON.
BUTTON HOLE SEWING MACHINE.
No. 438,812. Patented Oct. 21, 1890.
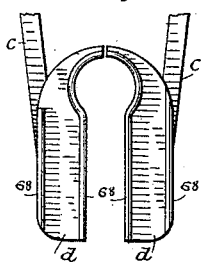
Fig. 16.
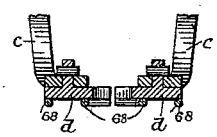
Fig. 17.
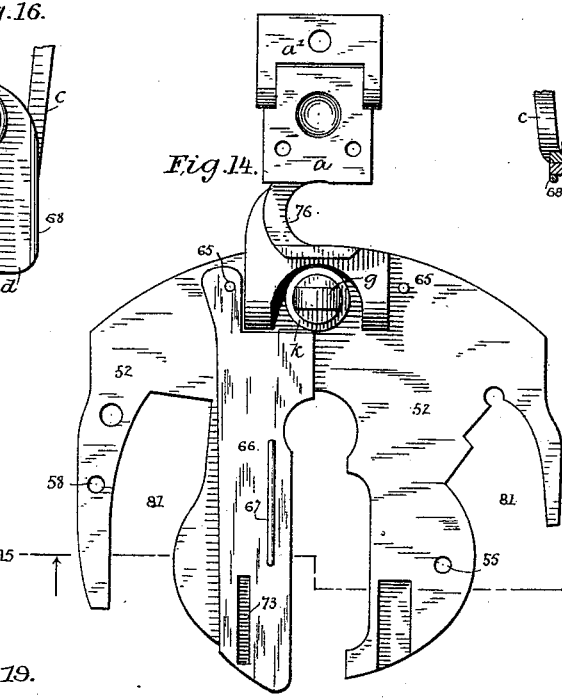
Fig. 14.
Fig. 19.
Fig. 15.
Fig. 18.
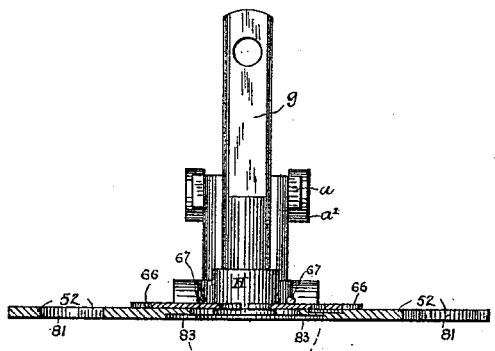
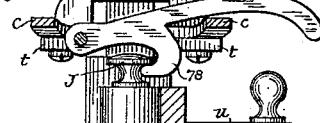
Fig. 8.
Witnesses
Inventor
John Q. A. Houghton
By his Attorney (No Model.) 9 Sheets—Sheet 7.
J. Q. A. HOUGHTON.
BUTTON HOLE SEWING MACHINE.
No. 438,812. Patented Oct. 21, 1890.

Witnesses
Jos. S. Latimer
Carleton E. Snell

Inventor
John Q. A. Houghton
By his Attorney (No Model.)  9 Sheets—Sheet 8.

J. Q. A. HOUGHTON.
BUTTON HOLE SEWING MACHINE.

No. 438,812.   Patented Oct. 21, 1890.

Witnesses  
Jas. S. Latimer  
Carleton E. Snell

Inventor  
John Q. A. Houghton.  
By his Attorney (No Model.) 9 Sheets—Sheet 9.

J. Q. A. HOUGHTON.
BUTTON HOLE SEWING MACHINE.

No. 438,812. Patented Oct. 21, 1890.

Witnesses
Jos. S. Lahmby
Carleton E. Snell.

Inventor
John Q. A. Houghton
By his Attorney

UNITED STATES PATENT OFFICE.

JOHN Q. A. HOUGHTON, OF BALTIMORE, MARYLAND.

BUTTON-HOLE SEWING-MACHINE.

SPECIFICATION forming part of Letters Patent No. 438,812, dated October 21, 1890.

Application filed May 17, 1889. Serial No. 311,188. (No model.)

*To all whom it may concern:*

Be it known that I, JOHN Q. A. HOUGHTON, of the city of Baltimore, in the State of Maryland, have invented certain new and useful Improvements in Button-Hole-Stitching Machines, of which the following is a specification.

Prior to the present invention button-hole machines have been made and used by means of which the button-hole is first cut, and is then stitched along one side around the eye and back on the other side of the button-hole, the stitching being accomplished continuously without any stoppage of the machine or any manual adjustment of any of the parts of the machine. The machines here referred to are those which are the best known and most generally used. The button-holes, however, as made on these machines have been incomplete, since it is necessary to also bar the button-hole across the end of the button-hole opposite the eye, and this barring of the button-hole has ordinarily been accomplished by means of a subsequent stitching operation entirely independent of the stitching of the sides and eye.

The object of the present invention is to furnish a machine which will, in addition to the cutting and stitching operations hitherto performed, bar, stay, and finish the button-hole complete, so that in a single machine the button-hole may be cut, stitched, barred, stayed, and completely finished, no further or additional operations being necessary to complete the button-hole.

In the machine constructed in accordance with the present invention the operation is continuous and without interruption from the making of the first stitch on the first side of the button-hole to the last locking-stitch of the bar of the button-hole. When the stitching has once been initiated, no manual adjustment of any of the parts is necessary, all of the adjustments necessary for stitching the different portions of the button-hole being automatically effected.

Prior to the present invention button-hole-stitching machines have been constructed in which the button-hole is automatically barred without an interruption of the stitching, and hence the present invention does not broadly cover the automatic formation of a bar; but the present invention consists in the improved and novel mechanisms for effecting the objects specified, and in the combination of such novel mechanisms with the present known and used button-hole-stitching mechanisms.

The improved and novel mechanisms constituting the basic features of the present invention can be adapted to nearly if not quite all of the present known and used button-hole machines.

In the accompanying drawings, which illustrate the invention, the improvements are shown as applied to one of the well-known button-hole machines.

Figure 2:
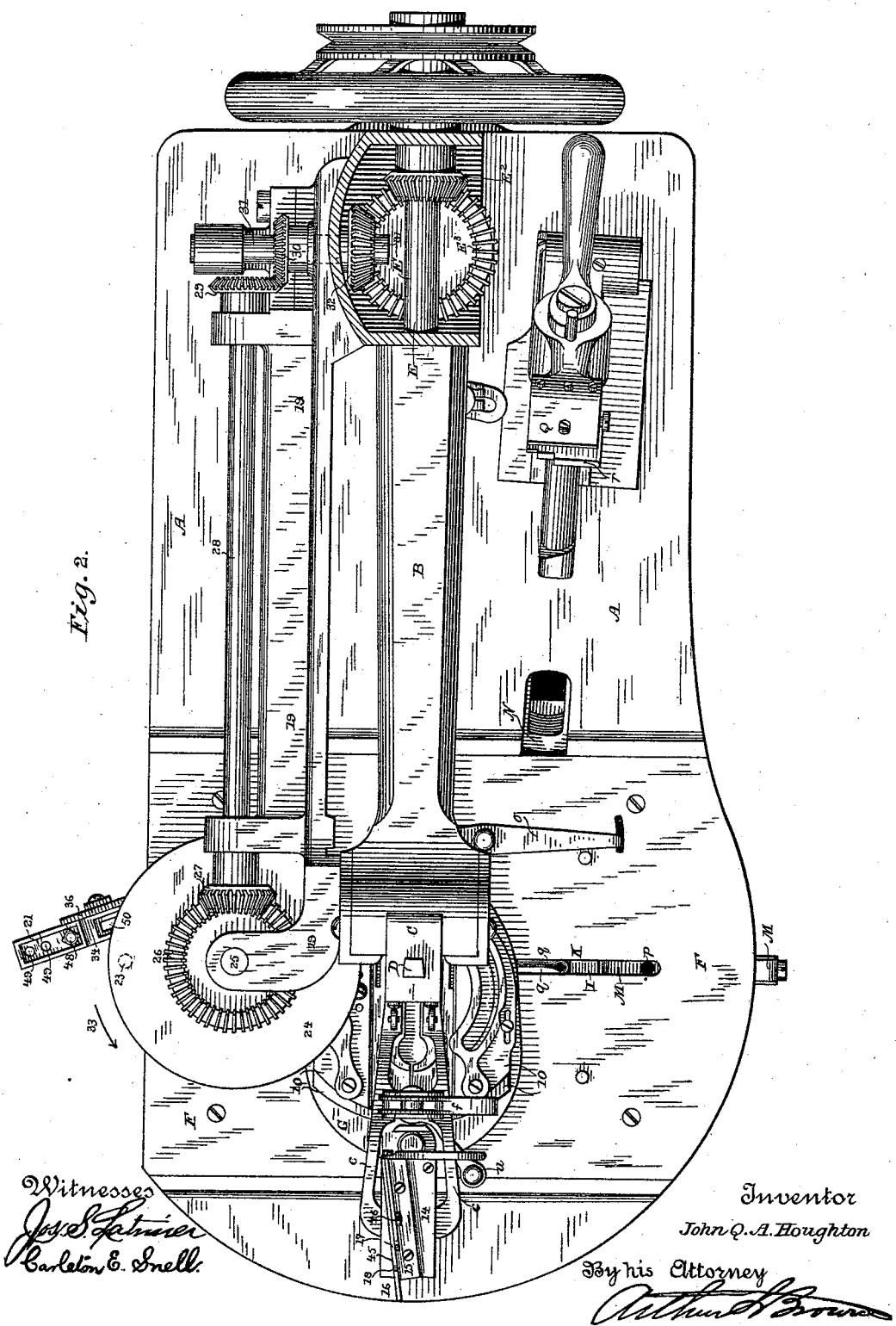
Figure 3:
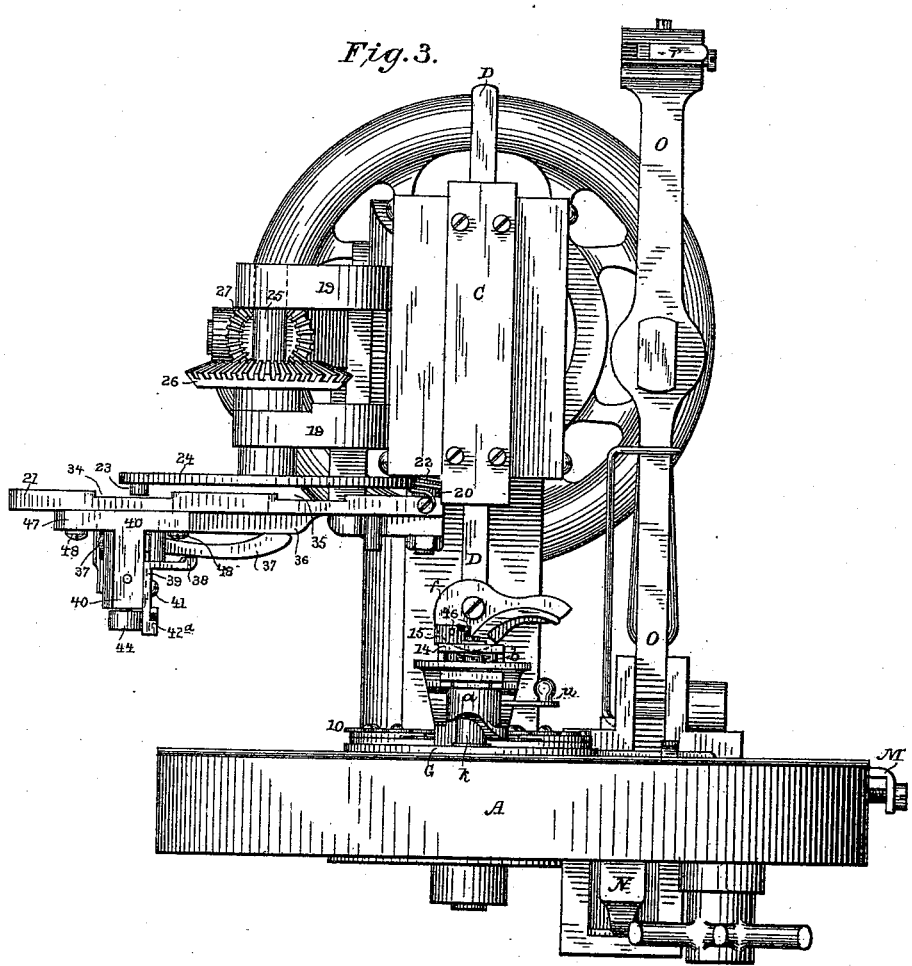
Figure 12:
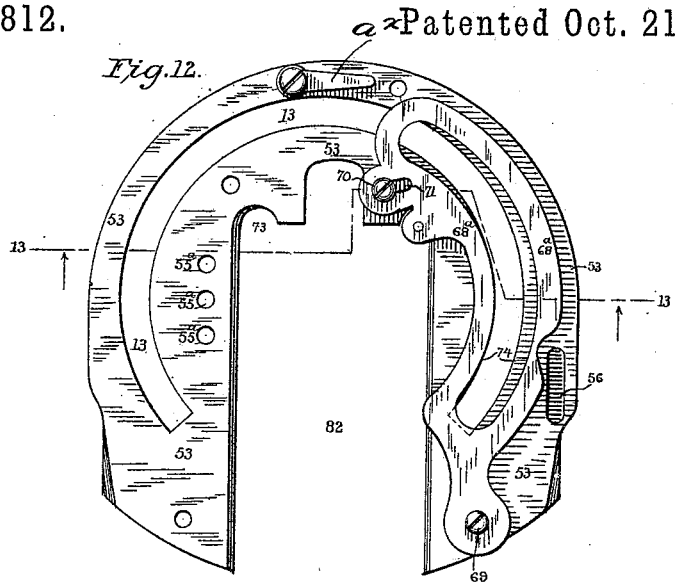
Figure 13:
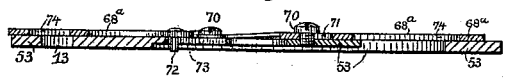
Figure 10:
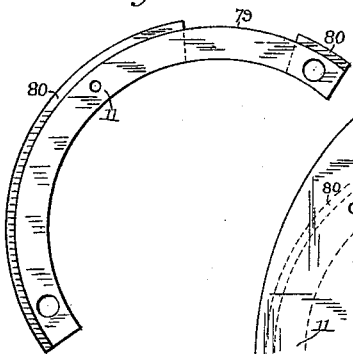
Figure 11:
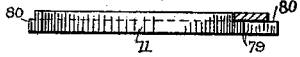
Figure 9:
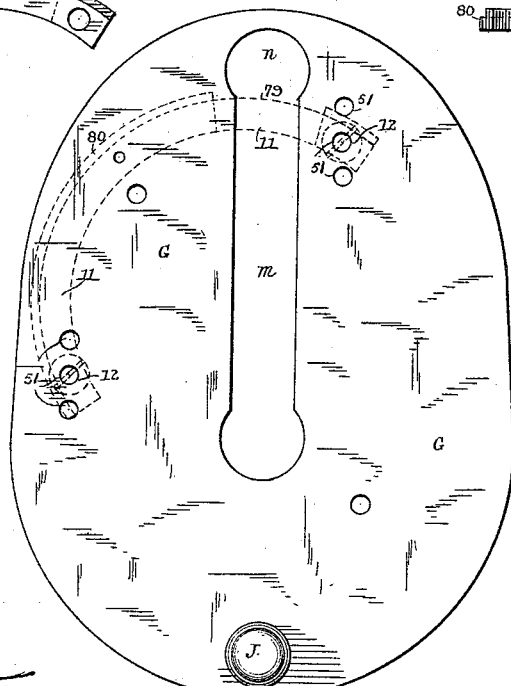
Figure 20:
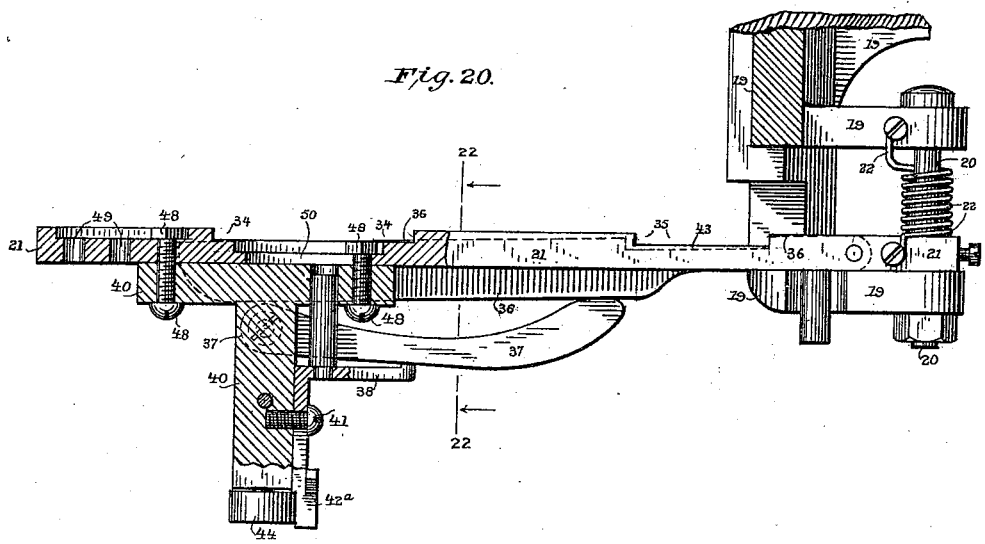
Figure 21:
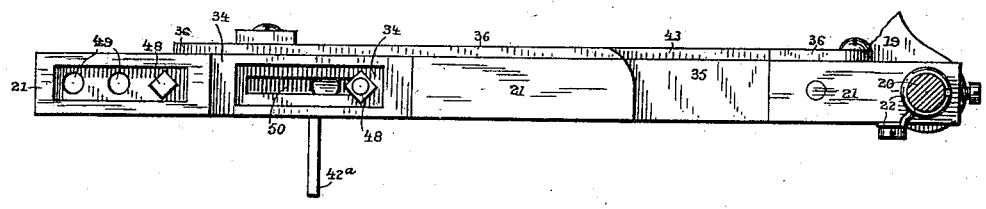
Figure 22:
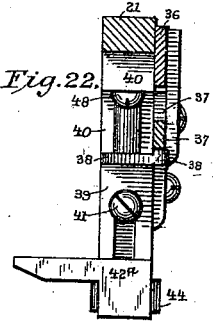
Figure 26:
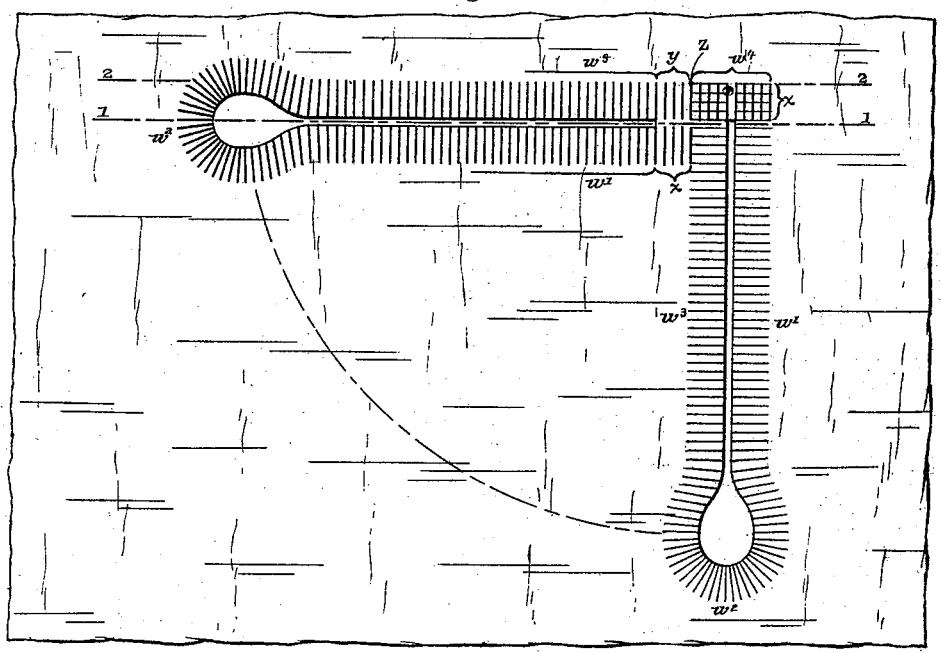
Figure 23:
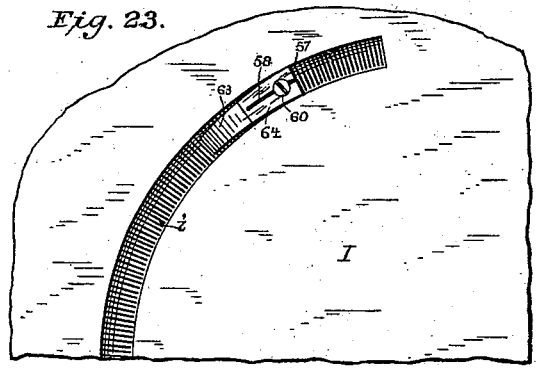
Figure 24:
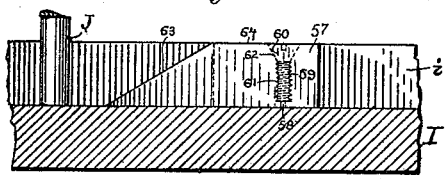
Figure 25:
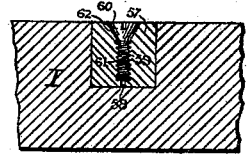

In the drawings, Figure 1 is a side view of a well-known machine provided with the present improvements, parts being broken away to show the construction more clearly. Fig. 2 is a plan view of the same. Fig. 3 is a front view of the same. Fig. 4 is a plan view of the feed-wheel, showing the relative position in dotted lines of the guide-slot in the bed-plate. Fig. 4$^a$ is a plan view of the stationary guide bed-plate. Fig. 5 is a plan view of the button-hole clamps or combined material carrier and holder detached. Fig. 6 is a vertical longitudinal section thereof. Fig. 7 is a side view thereof, looking in the direction indicated by the arrow 7 in Fig. 5. Fig. 8 is a cross-section thereof in a plane indicated by the line 8 8 in Fig. 5. Fig. 9 is a detail plan view of the button-hole material-carrier proper or of the bottom plate of the button-hole clamp. Fig. 10 is a detail detached plan view of the curved guide-rib. Fig. 11 is a vertical section of the curved guide-rib. Fig. 12 is a plan view of the bottom plate of the material-holder, showing one of the swinging clamp-wings in position. Fig. 13 is a vertical section thereof in a plane indicated by the line 13 13 in Fig. 12, both swinging clamp-wings, however, being shown in section. Fig. 14 is a detail plan view of the upper plate of the material-holder, showing one of the cam-blades in position. Fig. 15 is a vertical section thereof on a plane indicated by the line 15 15 in Fig. 14, both cam-blades, however, being shown in section. Fig. 16 is a face view of one of the upper clamp-jaws in detail. Fig. 17 is a vertical cross-section thereof. Fig. 18 is a face view of a modified form of clamp-jaw. Fig. 19 is a cross-section of upper and lower clamp-jaws having the modified form. Fig. 20 is a detail side view, partly in vertical section, of the automatic shifting-arm. Fig. 21 is a plan view thereof. Fig. 22 is a vertical cross-section thereof in a plane indicated by the line 22 22 in Fig. 20. Fig. 23 is a plan view of a fragment of the feed-wheel, showing the guide-pin lifter in plan. Fig. 24 is a vertical section of a fragment of the feed-wheel, showing the side of the guide-pin lifter. Fig. 25 is a vertical section of a fragment of the feed-wheel, showing the guide-pin lifter in vertical section. Fig. 26 is a diagram showing how the bar of the button-hole is stitched, and Fig. 27 is a view of the completed button-hole.

Like letters and numerals of reference refer to corresponding parts in all of the figures, and in the following description, for the sake of convenience, reference-letters are used to designate parts which have hitherto been used in button-hole-stitching machines, and reference-numerals are used to designate the added parts which constitute the basic features of the invention.

First will be described the hitherto known and used features of the illustrated machine, which in themselves are old and constitute no part of the present invention, except in as far as they are employed in combination with the novel features.

A is the bed of the machine, on which are mounted the various operating mechanisms.

B is the machine-arm.

C is the face-plate.

D is the needle-bar.

E is the needle-bar drive-shaft, located in the machine-arm.

E' is the vertical shaft which operates the mechanism beneath the machine-bed, and $E^2$ $E^3$ are beveled gears located on the shafts E E', respectively, whereby motion from shaft E is communicated to shaft $E^2$.

Beneath the face-plate and removably secured to the bed is the stationary guide bed-plate F, on which slides and swings the button-hole clamp.

The button-hole clamp comprises a clamp-base G, which slides and swings on the plate guide-bed F, and cloth-clamping devices for retaining the cloth in which the button-hole is to be formed.

The cloth-clamping devices are carried by the clamp-base so as to be moved therewith, and are constructed as follows: H is the clamp-supporting post, to a horizontally and rearwardly extending bracket $a$ of which is pivoted the clamp-hinge $a'$. Removably secured to the clamp-hinge $a'$ by a screw $b$ are the two clamp-arms $c\ c$, which are formed out of a single piece of metal, being united at the hinge $a'$, so that their free ends are elastic and can be sprung apart. The free ends of the clamp-arms carry pivoted clamp-jaws $d\ d$—one on each clamp-arm—which when pressed down toward the clamp-base G hold the material in place during the stitching of the button-hole. The clamp-jaws $d\ d$ are normally held uplifted by a spring $e$, interposed between the clamp-post H and the connecting part of the clamp-arms $c\ c$. The clamp-jaws are depressed to hold the cloth by a presser-cam $f$, which turns on the upper end of a stationary bridge-post $g$, the presser-cam acting upon a bridge $h$, the two feet of which rest on the two clamp-arms $c\ c$, respectively, the bridge itself sliding upon and being guided by the squared upper end of the bridge-post $g$.

Beneath the plate F, on which the button-hole clamp moves, is the rotary feed-wheel I, which is rotated in the usual well-known manner. This feed-wheel is formed with a cam-groove $i$ on its upper surface, in which fits the lower end of the clamp guide-pin J, which passes through a guide-slot K in the bed-plate F. The clamp guide-pin J moves vertically in a sleeve $k$, rigidly secured to the clamp-base G, and is normally held by a spring $l$ in its lowermost position, with its lower end passing through the slot in the plate F and resting in the cam-groove of the feed-wheel.

The clamp-base is provided with a longitudinally-extending guide-slot $m$, having an enlarged eye $n$ at the end farthest from the guide-pin J. This eye $n$ fits over the enlarged head of the plate-button L; but the body of the slot $m$ is of a less width than the head of the plate-button, so that the clamp-base can only be removed from the bed-plate F when the eye $n$ is brought into coincidence with the plate-button. The plate-button is located immediately beneath and in line with the needle-bar, and has an elongated eye $j$, through which the needle passes.

The clamp-base is guided in its movements and is held to its proper and exact path by means of the shank of the plate-button passing through the slot $m$ and by means of the guide-pin J being held within the cam-groove of the feed-wheel and the guide-slot K in the bed-plate F. The clamp-base is further held in its proper path during the stitching operations by a spring-lever $o$, acting against the edge of the clamp-base.

The guide-slot K is made up of two straight sections $k'\ k^3$, in line with each other and with the plate-button L, and of an intermediate curved section $k^2$, connecting the straight sections and concentric with the plate-button. The first straight section $k'$ of the guide-slot is longer than the other straight section, and extends beyond the rim of the feed-wheel over an adjustable clamp cutter-gage M, having an aperture $p$ therein.

The button-hole-cutting mechanism consists, essentially, of an under cutter-lever N, having a cutter $q$, which is beneath and in the plane of the slot-section $k'$, and of a top cutter-lever O, carrying an anvil $r$, which coacts with the cutter $q$. The button-hole is cut in the fabric by the coaction of the cutter and anvil, the depression of the top cutter-lever by hand raising the under cutter-lever by intermediate connections of well-known character requiring no special description for an understanding of the present invention. The initial end of the cam-groove in the feed-wheel which first acts upon the clamp guide-pin J terminates in an enlarged opening $s$ in the feed-wheel, through which the cutter $q$ passes to cut the button-hole.

In order to cut and stitch a button-hole, the feed-wheel is first brought into proper position with its opening $s$ above the cutter and below the slot-section $k'$. The fabric is then clamped in position by means of the clamp-jaws $d$ $d$, and the clamp-base is then swung around in such position that the guide-pin J fits into the aperture $p$ of the clamp cutter-gage, thus bringing the slot $m$ in the clamp-base and the space between the clamp-jaws above the cutter. The cutter is then operated, thus cutting out the button-hole.

Before stitching the button-hole it is essential to spread apart the opposite sides of the button-hole, so as to allow space for the passage of the needle between them. This is accomplished by mechanism known as a "spreader." The spreader consists of a spreading cam-sleeve P, encircling and turning around the bridge-post $g$ and between the clamp-arms $c$ $c$. The clamp-arms are provided with bunter-blocks $t$ $t$, respectively, which are pressed against the outer periphery of the cam-sleeve P by the elasticity of the clamp-arms. The cam-sleeve is turned by a hand-lever $u$ attached thereto. When the button-hole is cut, the cam-sleeve is so turned that its smaller diameter is between the bunter-blocks; but after the button-hole is cut the cam-sleeve is turned so that its greater diameter is between the bunter-blocks. This separates the clamp-arms, and thus spreads apart the cloth on either side of the button-hole, which is held by the clamp-jaws. The button-hole having thus been cut and spread, the guide-pin J is lifted by hand out of the aperture $p$ in the gage M, and the clamp-base is then moved forward in the line of the slot-section $k'$ until the guide-pin is above the opening $s$ in the feed-wheel. The guide-pin is then dropped, and the clamp-base is then moved back by hand until the guide-pin is brought in contact with the outer margin of the opening $s$. The feed-wheel is then turned by hand until the front edge of the button-hole is brought immediately beneath the needle-point. The stitching mechanism is then set in operation. While the stitches are being formed the clamp-base is carried along in a right line until the guide-pin J reaches the juncture between the straight slot-section $k'$ with the curved slot-section $k^2$. At this point the stitching of the first side of the button-hole—that is, the side $w'$ in Fig. 27—is completed. The feed-wheel then carries the guide-pin J around in the curved slot-section $k^2$, the clamp-base turning on the plate-button L as a center. While the guide-pin is traveling in the curved slot-section the eye of the button-hole is stitched. When the juncture between the curved slot-section $k^2$ and the second straight slot-section $k^3$ is reached, the stitching of the eye $w^2$ (see Fig. 27) is completed, and the guide-pin J is then carried along in the straight slot-section $k^3$ until the second straight side $w^3$ (see Fig. 4) of the button-hole is completed. As shown in Figs. 5 and 12, the clamp-base is provided with the usual spring thread-catch $a^x$, which holds in place the end of the ordinary staying-cord, which is passed up through the eye $j$ in the plate-button L. This staying-cord being thus fastened to the clamp-base is fed by the movement thereof and is laid around the margin of the button-hole, and over it the stitches are taken, all in the usual well-known way. As soon as the stitching is completed the motion of the machine is stopped. The guide-pin J is then lifted out of the cam-groove of the feed-wheel and out of the guide-plate, and the clamp-base is then swung around by hand, turning on the plate-button, and the material can then be removed. It is then necessary to bar and finish the button-hole, which when the usual style of machines hitherto in use have been employed has been done by hand.

The mechanism thus far described in detail is all old and well-known, and in describing the various parts the terms have been employed which are given to the several parts in the trade. The essential features of the described mechanism consist of the cutter, the stitching mechanism, the bed-plate, the feed-wheel, and a material holder and carrier, (hereinbefore called the "button-hole clamp,") which moves and slides on the bed-plate by the action of the feed-wheel. The essential movement of the material holder and carrier is, while the feeding is continuously in the same right line, (except during the stitching of the eye,) that the position of the material holder and carrier should be reversed during the stitching of the two sides—that is, considering the first movement of the material holder and carrier to be a forward movement, the material holder and carrier is fed forward, is automatically turned to a reverse position, and is then fed backward, the feed being, however, continuously in the same direction and the stitching mechanism operating without interruption. Now, the present invention consists in its principal feature in again automatically turning the material which is being operated upon after the second side of the button-hole has been stitched to a position crosswise of the line of feed, so that while the feeding still continues in the same right line the stitches will be formed on the fabric across the end of the button-hole, thus barring and completely finishing the button-hole. This result is accomplished by certain additions to and changes in the construction of the material holder and carrier, and in shifting mechanism added to the head or other suitable part of the machine for automatically shifting the position of the cloth in order to bar the button-hole.

First will be described the construction of the material holder and carrier. Instead of the cloth holder or clamp being attached directly to the clamp-base G or base of the material-carrier, as in prior constructions, the clamp-post H is secured to a material-holding base 10, which rests upon the base G. Since the clamp-post H is thus supported on the base 10, the base 10 carries all of the parts hitherto enumerated as part of the cloth-clamp, except the guide-pin J, its sleeve k, and the slot m, with its eye n, which are still carried by and are in the base G. This being the case, the plate-base 10, with the parts carried thereon, may be appropriately termed the "material-holder," and the base G, with the parts carried thereby which are independent of the base 10, may be appropriately termed the "material-carrier." These terms will hence be used in the following description for the sake of clearness and conciseness, it being understood that when the term "material-carrier" is used the base G is meant, when the term "material-holder" is used the base 10 is meant, and when the term "material holder and carrier" is used the entire sliding and turning mechanism is referred to.

The material-holder 10 is not rigidly secured to the material-carrier G, but is mounted so as to turn thereon. In order to enable the material-holder to turn on the material-carrier the following construction is adopted: On its upper surface the material-carrier is provided with an upwardly-projecting segmental rib or flange 11, which extends in the arc of a circle, and which is preferably detachable from the material-carrier, being for this purpose fastened thereto by screws 12 12, located near opposite ends of the rib 11. The material-holder is formed with a curved slot 13, extending in the arc of a circle, which fits over the rib 11. The slot 13 is longer than the rib 11, the relative lengths of the two determining the extent of arc through which the material-holder may be turned on the material-carrier. The heads of the screws 12 are wider than the widths of the rib 11 and slot 13, as that said heads extend beyond the margins of the slot 13, thus preventing the material-holder being removed from the material-carrier as long as the screws remain in position. The coacting rib 11 and slot 13 and the screws 12 12 constitute the sole connection between the material-carrier and material-holder. Owing to this construction it is evident that the only relative movement between the material-carrier and material-holder which is possible is a turning movement of the material-holder on the material-carrier, and as long as nothing acts to turn the material-holder thereon the two will move together. The material-holder is suitably apertured in the center, as shown, so as to permit the passage of the cutter and the needle therethrough. Secured to the bracket a of the clamp-post H (which is secured to the material-holder) is a horizontally and rearwardly extending plate 14, which extends above the rear end of the clamp-arms c c. To this plate 14, which extends above the rear end of the clamp-arms c c, is secured a vertically-extending shifting-arm 15, having its upper edge a cam-edge. This edge is composed of two straight portions 16 17 in different planes, and an incline 18 connecting the same. The outer end of the lower portion 16 of the edge of the shifting-arm may be beveled.

Attention will now be directed to the mechanism for shifting the position of the cloth to bar the button-hole. Journaled in a suitable bracket 19 on the machine-arm B is a vertical rock-shaft 20, to which is secured a horizontally-extending swinging arm 21, the movement of which is limited in either direction by coming in contact with fixed portions of the machine which constitute stops, but the total extent of movement being approximately through an arc of ninety degrees. The swinging arm is normally held in a state of rest at its most rearward position by a coiled retracting-spring 22, surrounding the rock-shaft and attached at opposite ends to the bracket 19, and the swinging arm 21, said spring automatically returning said arm to its normal position when moved therefrom and when free to be retracted. The swinging arm is swung forward by means of a downwardly-projecting eccentric tappet-pin 23, located on the under side of a rotating tappet-wheel 24, which turns in a horizontal plane immediately above the plane of the swinging arm. The vertical shaft 25 of the tappet-wheel 24 is journaled in suitable bearings in the bracket 19 and carries a bevel-gear 26, which meshes with a bevel-gear 27 on one end of a horizontal shaft 28, parallel with the shaft E. The shaft 28 carries at its other end a bevel-gear 29, which meshes with a bevel-gear 30 on one end of a horizontal shaft 31, extending at right angles to shaft 28. The horizontal shaft 31 carries on its inner end a bevel-gear 32, which meshes with and is driven by the bevel-gear $E^3$ on the rotating shaft E'. In this manner the horizontal tappet-wheel 24 is rotated in the direction indicated by the arrow 33, and by properly proportioning the several intermediate gears the speed of rotation of the tappet-wheel can be timed with that of the stitching mechanism. Since in button-hole-stitching machines it requires two vertical reciprocations of the needle-bar to make a single stitch, a proper speed for the tappet-wheel is to have it complete one rotation during two reciprocations of the needle-bar.

Since the purpose and object of the swinging arm 21 and its operating mechanisms is to shift the position of the cloth to bar the button-hole, it would not only be unnecessary, but would render the shifting mechanism defective in operation, should the arm 21 be swung at all except at the time the shifting is to be accomplished. Hence the arm 21 is provided with two sunken recesses 34 35 on its upper side, through which the tappet-pin 23 on the tappet-wheel 24 normally passes during the rotation of the tappet-wheel, so that the arm 21 is not moved by the tappet-pin. In order to have the arm 21 swung forward by the tappet-pin, it is hence necessary to interpose a stop of some character in the path of the tappet-pin. Such a stop is formed by a stop-bar 36, which is pivoted to the swinging arm, being alongside the same, with its upper edge normally below the bottom of the recesses 34 35. This stop-bar rests upon the end of a lever 37, which is pivoted to an extension-arm 40 of the swinging arm 21, and this lever in turn rests upon an outwardly and horizontal projecting arm 38 of a vertically-moving bar 39. This vertically-moving bar 39 lies adjacent to the extension arm 40, which extends downwardly from the extreme outer end of the arm 21, constituting a continuation and part thereof. The bar 39 is held and guided on the swinging arm 40 by means of a bolt 41, screwing into the swinging arm 40, which extends through a vertical slot 42 in the bar 39. The lower end of the bar 39 is provided with a horizontally outwardly-projecting striker-latch $42^a$, which is beveled on its lower outer edge. By lifting the striker-latch $42^a$ the bar 39 and lever 37 will be raised, thus lifting the stop-bar 36, so that its upper edge is projected above the lower edge of the outer recess 34, near the end of the swinging arm 21, into the path of the tappet-pin 23 on the tappet-wheel 24. The stop-bar is recessed at 43 on its upper edge, so that when it is raised its recess 43 will register with the recess 35 near the inner end of the swinging arm 21. The tappet-pin will thus pass through recess 35, as usual, and owing to the direction of the rotation of the tappet-wheel it will encounter the stop-bar on its rear side, thus swinging the swinging arm forward. As the tappet-pin moves the swinging arm forward it slides along the side of the stop-bar 36, thus constantly moving the swinging arm outward and forward until it reaches the point nearest the needle-bar. The tappet-pin is then carried away from the swinging arm, thus ceasing to swing the same forward, and leaving the swinging arm free to be retracted to its position of rest by the retracting-spring 22.

The mechanical construction has now been sufficiently described to enable the operation of barring the button-hole to be understood. During the stitching of the eye and two sides of the button-hole the operation is precisely the same as that hitherto described. The material-holder is carried along with the material-carrier during these operations, having no independent movement of its own. When the eye is stitched, the material-holder is swung around with the material-carrier, thus bringing the shifting-arm supported by the material-holder around in such position that it is in line with the projecting striker-latch $42^a$, the raising of which effects the elevation of the stop-bar into the path of the tappet-pin on the tappet-wheel. The further advance of the material-carrier while the second side of the button-hole is being stitched causes the lower portion 16 of the cam-edge of the shifting-arm 15 to pass beneath and in contact with the striker-latch 42, and just when the stitching of the second side of the button-hole is completed the incline 18 of the shifting-arm passes beneath the striker-latch, thus raising it to the level of the higher portion 17 of the cam-edge of the shifting-arm, upon which the striker-latch rests. This raising of the striker-latch elevates the stop-bar into the path of the tappet-pin on the tappet-wheel, thus causing the swinging arm 21, with its continuation 40, to swing forward. As the swinging arm 21 swings forward, an anti-friction bowl 44 on the lower end of the downwardly-extending portion 40 of the swinging arm comes in contact with the vertical face of the shifting-arm 15. The swinging arm thus presses against the shifting-arm in a direction at about right angles to the line of feed of the material-carrier—that is, at right angles to the straight slot-section $k'$ $k^3$ of the guide-slot in the bed-plate—thus causing the material-holder to turn out the curved rib 11 of the material-carrier. The parts are so proportioned that when the material-carrier is fed to the position where the second straight edge of the button-hole is completed the curved rib 11 is approximately concentric with the plate-button L, so that when the material-holder turns on the material-carrier it turns around the plate-button as a center. The material is therefore turned so that the point of the button-hole is kept in the path of the needle. The full movement of the swinging arm causes the material-holder to be turned to a position on the material-carrier crosswise of that occupied by it during the stitching of the straight sides of the button-hole, so that the button-hole slit is presented sidewise to the line of feed instead of occupying a position endwise of or in line with the feed, as it does during the formation of the two straight lines of stitching. When the material-holder has been turned the proper distance, the anti-friction bowl 44 and the striker-latch 42 move off from the shifting-arm 15, thus ceasing to move the material-holder and allowing the striker-latch and the lever and stop-bar supported thereby to drop by gravity to their lower normal positions, with the stop-bar out of the path of the tappet-pin on the tappet-wheel. When the tappet-pin is immediately after carried out of contact with the stop-bar on the swinging arm, said swinging arm resumes its normal state of rest until the next button-hole is stitched and ready to be barred. The swinging arm while turning the material-holder with the material clamped thereon does not affect the position of the material-carrier, which still remains in position with the guide-pin J held within the cam-groove of the feed-wheel and the second straight section $k^3$ of the guide-slot K, so that the rotation of the feed-wheel continues to feed the material-carrier in the same direction. The material having, however, been turned with the material-holder crosswise of the line of feed, the further feeding of the material-carrier causes the stitching to be done across the end of the button-hole, thus forming the bar $w^4$ thereof. (See Fig. 27.) When the last stitch of the bar is completed, the machine is stopped and the button-hole is complete. By properly proportioning and adjusting the parts the bar will be formed, extending from the outer edge of the line of the second straight side to the outer edge of the first straight side, and the bar-stitches will be locked around the end side stitches, thus at the same time staying and fastening the button-hole.

It has been stated that when the material is turned to bar the button-hole the curved guide-rib should be approximately concentric with the plate-button, so as to turn on the same as a center. It will be evident, however, that the exact center on which the material turns will determine the length of the bar and its relation to the stitches on the straight sides of the button-hole. These features of the bar can be varied without departing from the essential features of the invention; but to accomplish the best results a certain specific relation should be established between the position of the curved guide-rib on the material-carrier and the plate-button.

As is well known, in button-hole-stitching machines the face-plate is reciprocated so that the needle on its outstroke will pass through the slit of the button-hole and on its instroke will pass through the material. Owing to the position of the material being reversed to stitch the two sides of the button-hole, it also necessarily follows that a vertical plane passing through the needle when on its outstroke will, if parallel with the straight sections of the guide-slot in the bed-plate, pass through the center of the said straight sections and also through the center of the slot in the material-carrier. Now, in order to secure the best results in barring the button-hole in accordance with the present invention, the geometric center of the arc of the curved guide-rib should always be coincident with a line parallel with the straight sections of the guide-slot in the bed-plate and in the vertical plane of the point of the needle when on its instroke, and the shifting mechanism should be so adjusted that when the material is turned it shall turn in the arc of a circle the center of which is coincident with a vertical line passing through the point of the needle when on its instroke. To understand the effect of this construction on the formation of the bar, reference should be made to the diagram shown in Fig. 26. In this diagram the line 1 1 is drawn in the line of the feed, and it is also drawn to indicate the vertical plane of the needle on its outstroke. The line 2 2 is drawn parallel with the line 1 1 through the inner edges of the stitches of the second straight side $w^3$, and this line indicates the vertical plane of the needle on its instroke. The stitches $w'$ and $w^3$ (shown in heavy lines) show their position before the material has been turned to form the bar, and the stitches $w'$ $w^3$ (shown in light lines) show their position after the material has been turned to form the bar. Now, in order to secure the best results a few stitches (shown at $x$) should be stitched in the material before the point of the button-hole is reached, and the second straight side $w^3$ of the stitching should be continued for a few stitches (shown at $y$) beyond the point of the button-hole and into the material. The number of the stitches at $x$ and likewise at $y$ should be just sufficient to make their combined width equal to the length of a single stitch. By proper adjustment the mechanism will be so arranged that when the last of the stitches at $y$ are completed the material will be turned, and the center on which the material will turn is represented by the point $z$, which is coincident with the inner edge of the last of the stitches at $y$, which is the point where the needle entered the material on its instroke. Since the material is turned on the point $z$ through approximately an arc of ninety degrees, when the material is completely turned the stitches $x$ and $y$ will occupy the position shown in light lines—that is, they will all be between the lines 1 1 and 2 2. When, then, the bar-stitches $w^4$ are formed, they will interlock all of the stitches $x$ and $y$, and in so doing will thoroughly lock the stitches, so as to prevent the possibility of raveling, and also stay the end of the button-hole, so as to prevent the material tearing. A much better finish is also thus given to the button-hole. This result, it will be observed, is due to turning the material before the barring operation on a center coincident with a vertical line passing through the point of the needle when on its instroke, and by continuing the feed during the barring operation in the same line as during the formation of the second straight side of the button-hole; and in the formation proper of the bar itself the essential features of the operation are that the material-holder should be turned crosswise on the material-carrier and that the material-carrier should be fed along in the same continuous line of proper length of the bar to be stitched. To permit the proper additional feed, it is only essential to lengthen the second straight section $k^3$ of the guide-slot K and to lengthen the cam-groove in the feed-wheel.

In thus describing the mechanism for automatically forming the bar of the button-hole it is to be understood that only the best mechanism has been described for achieving the desired results which has been designed. The spirit and scope of the invention is, however, by no means limited to the exact mechanical construction shown, since they may be departed from and modified without changing the essential principle of the invention and its mode of operation.

The distinguishing characteristic features of the invention may be thus enumerated: First, the button-hole-stitching machine is in accordance with this invention characterized by having a material carrier and holder which is composed of two parts, one of which makes a single quick turn on and crosswise of the other, the turning part carrying with it the material, so that the button-hole slit in the material is presented sidewise to the line of feed instead of occupying a position in line with the feed, as it does during the formation of the two straight lines of stitching; second, the button-hole-stitching machine is in accordance with this invention characterized by having a material-holder which is automatically shifted or transposed to a crosswise position without interrupting the feed or the operation of the stitch-forming mechanism, so that the bar is composed of the same kind of stitches as the sides and eye of the button-hole; third, the button-hole-stitching machine is in accordance with this invention characterized by having a material holder and carrier having but a single guide-pin which is held continuously in operative relation with the feed mechanism, said material holder and carrier being composed of two parts, one of which makes a single turn on and crosswise of the other, one of said parts carrying with it the guide-pin and the other part carrying with it the material; fourth, the button-hole-stitching machine is in accordance with this invention characterized by a material holder and carrier composed of two parts, one of which turns about a center on the other, said center being in line with the point of the button-hole and said turning part turning when said center is in line with the needle.

The button-hole-stitching machines to which the improvements are preferably applied are of the well-known kind for making eyed button-holes, wherein there are employed upper and lower silks or threads and a staying-cord, which is laid around the margin of the button-hole on the right side of the material, and over which the stitches are taken, as is usual and customary in stitching button-holes. This staying-cord, as eyed button-holes are ordinarily made, is guided to the fabric and presented to the edge of the button-hole so that it lies under the stitches on both sides of the button-hole and under the stitches around the eye of the button-hole, and when the stitching of the button-hole is completed its two ends are left projecting beyond the straight sides of the button-hole and in line therewith. It has hitherto been necessary in machines of the character referred to which make eyed button-holes to fasten or "stay" these loose ends by hand and then to cut the ends off or else to finish the button-hole on a separate machine. With the present improvements, however, in the same machine and by a continuous operation the staying-cord is laid across the point of the button-hole and beneath the barring-stitches, as well as beneath the other stitches, and the two ends are left projecting together, so that the cord is automatically fastened or stayed, and to entirely finish the button-hole it is only necessary to cut the threads, all of the threads and both ends of the staying-cord being cut simultaneously, since they are all grouped at a single point. After the material is removed from the machine the button-hole is ready for use.

In addition to the main object of the invention, which is automatically to bar the button-hole, the invention also includes means for adjusting the machine to enable different lengths of button-holes to be made on the same machine, means for automatically discontinuing the feeding of the material-carrier when the barring of the button-hole is completed, and means for contracting or closing the button-hole before it is barred. These several mechanisms will be described in succession.

In order to adjust the machine for stitching button-holes of different lengths, it is necessary to adjust the feed, to adjust the contact between the shifting-arm on the material-holder and the striker-latch, the lifting of which automatically brings the shifting mechanism into operation, so that the material-holder will be turned when the sides of the button-hole are completely stitched, and to adjust the coacting curved rib and slot on the material-carrier and material-holder, respectively, as that whenever the material-holder is turned it will turn in an arc concentric with the needle on its instroke.

To render the feed capable of working with button-holes of different lengths, it is only necessary to make the cam-groove in the feed-wheel of sufficient length for the longest button-hole desired. For any shorter button-hole the material-carrier is fed along by hand in the usual manner until the end of the button-hole is brought beneath the needle, and the stitching is stopped when the button-hole is completed.

To cut out different length button-holes, the clamp cutter-gage M is adjustable lengthwise, and different-sized anvils r are inserted in the top cutter-lever O. These adjustments are in themselves old and well known.

To turn the material-holder at the proper time to bar the button-hole, the shifting mechanism must be brought into operation quicker for a short button-hole than for a long one. This may be conveniently regulated by making the shifting-arm 15 and the swinging arm 21 relatively adjustable, which may be accomplished either by making the shifting-arm longitudinally adjustable or by making the striker-latch 42 of the swinging arm adjustable. Both adjustments are shown.

For this purpose the shifting-arm is provided with an auxiliary sliding cam-plate 45, secured to the shifting-arm by an adjusting-screw 46, which passes through either a series of apertures or a longitudinal slot 46ª in the shifting-arm, the length of which determines the extent of adjustment. The cam-plate 45 is provided with a cam-edge having straight portions 16 and 17, and an intermediate incline 18, the same as the shifting-arm. By adjusting the cam-plate outwardly the incline 18 is projected so that it encounters the striker-latch 42 earlier, so as to turn the material-holder sooner when a short button-hole is being stitched. To adjust the striker-latch 42 for the same purpose, the depending extension 40 of the swinging arm 21 is not formed in one piece therewith, but is connected with an adjustable sliding plate 47 on the under side of the swinging arm. This plate is secured to the swinging arm by means of adjusting screw-bolts 48, which pass through a series of apertures 49 or a longitudinal slot 50 in the swinging arm. By this means the striker-latch may be brought nearer to or farther from the needle-bar and the shifting-arm on the material-holder.

To enable different lengths of button-holes to be properly barred, it is essential that the material-holder when it turns should turn under all circumstances in an arc concentric with some part of the plate-button. Otherwise the end of the button-hole will not be beneath the needle after the material-holder has been, and preferably, as already stated, the material-holder should turn in an arc concentric with the instroke of the needle. To enable this to be done, it is first necessary to make the curved rib 11 adjustable on the material-carrier. This is readily accomplished by providing a series of screw-holes 51 in the material-carrier, into which the screws 12, connecting the rib to the carrier, may be placed in succession. For a long button-hole the screws are fitted into the holes farther away from the guide-pin J, and vice versa. Since the rib 11 is adjustable longitudinally of and in line with the guide-slot $m$ in the material-carrier the geometric center of the arc of the rib will always be coincident with a line parallel with the axis of the guide-slot and passing through a vertical line coincident with the point of the needle when on its instroke.

It is essential that the material should be held in a position on the material-holder which shall bear a fixed and immovable relation to the material-carrier, (since otherwise the eye of the button-hole would not be properly stitched,) and it is also essential that the curved slot 13 in the carrier should always coact with the curved rib 11. Hence, therefore, to fulfill these conditions it is necessary to make the base 10 of the material-holder in two parts, which shall be relatively adjustable. To this end, therefore, the base is composed of a lower plate 52 and an upper plate 53, which are made relatively adjustable by means of adjusting-screws 54, which enter screw-holes 55 in the bottom plate 52 and extend through either a series of apertures 55ª or longitudinal slots 56 in the top plate 53. Apertures 55ª are shown for one of the screws 54 and a slot 56 for the other, (as in the case of the adjustments of the striker-latch 42,) to indicate that either or both means of adjustment may be employed. The lower plate 52 carries the clamp-post H and its attachments, while the curved slot 13 is formed in the upper plate 53. By adjusting the plates 52 and 53 to correspond with the adjustment of the curved rib 11 the position of the clamp-post H and its attachments relatively to that of the guide-pin J on the material-carrier remains unchanged, and hence the material-holder may turn at the proper point to bar button-holes of different lengths without interfering with the proper stitching of the eye of the button-hole. The spring thread-catch $a^x$, for holding the end of the staying-cord, is (as a convenient position) attached to the upper adjustable plate 53 of the material-holder, where it crosses the guide-slot $m$, so that it is adjusted with the said plate.

It is desirable that the feeding of the material-carrier should be automatically stopped as soon as the button-hole is barred, since otherwise not only would the material be stitched to one side of the button-hole, but also (which is a more serious objection) the further feeding of the carrier would bring beneath the needle one of the clamp-jaws, (which when the button-hole is being barred stands crosswise of the guide-slot $m$,) resulting in the breaking of the needle. It is quite difficult to stop the stitching on an exact stitch, especially when the machine is run at a high speed; but if the feed of the material-carrier is stopped at the end of the bar a few additional stitches at the same point will be of no detriment, but will be beneficial, since they will thoroughly lock the end of the thread.

Button-hole-stitching machines have hitherto been provided with means for automatically effecting the stopping of the feeding of the material-carrier on the completion of the second straight side of the button-hole, such means consisting in making the end of the cam-groove in the feed-wheel concentric with the axis of rotation of the feed-wheel. Such means can be used for the purpose of the present invention, but are inapplicable for stitching button-holes of varying lengths. To provide such means applicable to button-holes of varying lengths, an adjustable guide-pin lifter 57 is placed in the cam-groove of the feed-wheel near its end. This guide-pin lifter fits in the cam-groove so as to slide therein, and is split at its rear end by a slit 58, so that it can be expanded to bind tightly against the side walls of the cam-groove. The expansive and contractible split end of the guide-pin lifter is expanded by means of a wedging tap-screw 59, having a conical or wedge-shaped head 60, the wedge-screw entering a threaded hole 61, formed in the adjacent inner walls of the split lifter, and the conical wedging-head entering a conical expansion 62 of the hole 61. The upper surface of the guide-pin lifter is provided with an incline 63, the lower edge of the incline starting at the bottom of the cam-groove in approximately the plane thereof, and the upper edge of the incline being in the same plane as the general upper surface of the feed-wheel. The upper surface of the guide-pin lifter is provided with a platform 64, extending from the upper edge of the incline 63 a short distance in the same plane as the upper surface of the feed-wheel.

In order to adjust the position of the guide-pin lifter to adapt the stop to button-holes of different lengths, it must be moved along in the cam-groove. Since the cam-groove is a curve which is not the arc of a circle, the guide-pin lifter cannot throughout its length fit the groove, and hence its sides converge from the expansible and contractible split end to the lower edge of the incline 63. The guide-pin lifter having been adjusted to the proper position to stop the feeding of the material-carrier for the desired length of button-hole, when the stitching approaches completion the lower end of the guide-pin J is encountered by the lower edge of the incline 63 of the guide-pin lifter. As the feed-wheel continues to rotate, the guide-pin J is carried along up the incline until it is lifted entirely out of the cam-groove, with its lower end resting on the platform 64. As soon as the guide-pin is clear of the cam-groove the feeding of the material-carrier ceases, even though the feed-wheel may continue to be rotated. In case the rotation of the feed-wheel is continued the guide-pin will not drop off again from the platform 64 into the cam-groove, since before the end of the platform 64 is reached a portion of the lower end of the guide-pin will be supported by the upper surface of the feed-wheel. Not only does this guide-pin lifter thus stop the feeding of the material-carrier at any proper point, but it also fulfills the object of the usual fixed guide-pin-lifting inclines, which have hitherto been placed at the ends of the cam-grooves of button-hole-machine feed-wheels to prevent the strain upon the guide pin in case the rotation of the feed-wheel is continued, which would be caused by an abrupt termination of the cam-groove.

As already described, before the button-hole is stitched it is spread apart by the action of the spreader in order to permit the passage of the needle; but before barring the hole it is desirable to have the button-hole closed in order that it may not be stitched in its open position, for if so stitched the material would be slightly "puckered," and the sides of the button-hole would not be closed together in a workmanlike manner. Hitherto, where the barring has been done by hand after the removal of the material from the material-holder, it has been a simple matter to close the button-hole by hand. In the present invention, however, it becomes necessary in order to close the button-hole to provide a closing mechanism which shall act while the material-holder is turning on the material-carrier. This mechanism is as follows: Pivoted on studs 65, carried by the bottom plate 52 of the material-holder on each side of the clamp-post H, are two swinging closing-jaws 66, which lie and swing upon the upper surface of the bottom plate 52 with their adjacent edges in line with the margins of the guide-slot $m$ in the material-carrier. These button-hole-closing jaws carry the clamp-faces, which coact with the clamp-jaws $d\ d$. These clamp-faces, as well as the clamp-jaws, may be provided with any suitable means for firmly gripping the material and holding it in position. The gripping means shown consists of a single longitudinal projecting rib 67 on the upper face of each button-hole-closing jaw and two similar longitudinal projecting ribs 68 on the under face of each clamp-jaw $d$, which straddle the rib 67. When the material is held between the button-hole-closing and material-clamping jaws and the upper clamp-jaws and the closing-jaws are swung together, the margins of the material on each side of the button-hole will be drawn together, thus closing the button-hole. The elasticity of the upper clamp-jaws permits them to move together when the lower closing-jaws are swung together.

The means for closing the button-hole-closing jaws or for swinging them toward each other are supported by the upper plate 53 of the material-holder. The button-hole-closing jaws lie between the upper and lower plates 52 and 53, the upper plate where it lies over the wings being recessed, so as not to contact with the closing-jaws or interfere with their movement. On the upper surface of the upper plate 53 are two cam-blades $68^a$— one for each of the button-hole-closing jaws. Each cam-blade is pivoted at one end to the upper plate 53 by means of a screw-stud 69, tapping into the plate 53, so that the cam-blade lies and turns upon the upper surface of the plate 53. The outer end of each cam-blade is guided and its extent of movement limited by a screw-stud 70, tapping into the plate 53, which extends through a curved slot 71 in the cam-blade, which is concentric with the screw-stud 69. Near the moving end of the cam-blade and near the screw-stud 70 each cam-blade is provided with a downwardly-extending pin 72, the edge of the plate 53 being cut away for its passage. This pin 72 enters an embracing longitudinally-extending slot 73 in the button-hole-closing jaw below. Each cam-blade has a slot 74, extending through an arc at least as great as the angular extent of rotation of the material-holder on the material-carrier. This cam-slot embraces the head 75 of one of the screws 12, that secures the curved rib 11. This head, which thus constitutes a fixed cam-stud, is in contact with the opposite margins of the cam-slot 74. The cam-slot 74, while being over the curved rib 11, does not register therewith, nor is it concentric therewith. On the contrary, the curve of the cam-slot 74 (if the arc of a circle, which it may be, though not necessarily so) is struck from a different center from that of the curved rib 11. Consequently when the material-holder is turned to bar the button-hole the fixed cam-studs 75, which are fixed to the material-carrier, act upon the inner margin of the cam-slots 74 in the cam-blades, thus swinging the moving ends of the cam-blades toward each other. This movement of the cam-blades through the pins 72 in the slot 73 swings the button-hole-closing jaws toward each other, thus closing the button-holes. This movement is effected while the material-holder is being turned, so that the button-hole is automatically closed before the first stitch on the bar is formed. When the material-holder is turned back to its usual position, the cam-studs 75 act on the outer margins of the cam-slots 74, thus automatically spreading the blades 68 and the jaws 66 apart.

The described construction of the upper and lower jaws with longitudinally-extending projecting ribs lying between each other is adopted with the special object in view of enabling the button-hole to be automatically closed. The closing mechanism acts only on the lower pair of the clamp-jaws, and in case the elasticity of the upper clamp-jaws is insufficient to permit them to be sprung toward each other to the required extent the lower clamp-jaws, nevertheless, are enabled to be moved toward each other to the proper extent, since the ribs 68 on each upper jaw are separated far enough to allow room for the proper lateral movement of the rib 67 on the lower jaw. Hence, owing to the separation of the ribs on the upper jaws, the lower clamp-jaws are capable of a lateral movement independent of the upper clamp-jaws. In this connection it may be said that it is not new to make the bottom clamp-jaws movable. In the preferred types of button-hole-stitching machines now in the market the bottom clamp-jaws are made elastic and are arranged, like the upper clamp-jaws, to be operated by the spreader. In such prior machines the bottom clamp-jaws are not, properly speaking, button-hole-closing jaws since they have no means for closing them except their own elasticity, which can only be brought into action by the manipulation of the spreader.

The button-hole-closing jaws made in accordance with the present invention are characterized by being pivoted to the material-holder by having independently and automatically acting mechanism for closing them, and by the relation which exists between the action of automatically-closing mechanism and the crosswise transposition of the material for the barring operation.

A few details of construction of the mechanism incidental to the main features of the invention have not hitherto been referred to since their description hitherto would have confused the description of the more important features. These details will now be alluded to.

In prior button-hole machines the clamp-guide pin J has usually passed through the hollow bore of the clamp-post H, and has had a milled head, so as to be lifted by hand. In the present invention, however, the guide-pin should not pass through the clamp-post, since the guide-pin is supported by the material-carrier and the clamp-post is carried by the material-holder. Hence the guide-pin passes through a separate sleeve $k$, as already described. In order that the clamp-post H shall not interfere with the sleeve $k$ and that the parts supported by the clamp-post shall occupy their proper positions, the clamp-post is secured, as shown at 76, so as to fit around the guide-pin sleeve $k$. Owing to the shifting-arm 15, carried by the clamp-post, extending above the upper end of the guide-pin J, the latter cannot be lifted directly by hand, and hence a lifting-lever 77 is provided, pivoted to the clamp-post, which has a lifting-tongue 78, entering beneath the milled head of the guide-pin. The bracket $a$ of the clamp-post passes freely over the top of the guide-pin. The projecting curved rib 11 on the material-carrier has a recess 79 on its under side at the place where it crosses the guide-slot $m$, so as to permit the rib to pass freely over the plate-button L. Since only the upper plate 53 coacts with the rib 11, the rib is formed at its lower part with a projecting flange 80, on which the upper plate 53 rests. The bottom plate 52 of the material-holder has wide side recesses 81, which pass around but out of contact with the curved rib 11 when the material-holder is turned. The central opening 82 of the top plate 53 is broad enough to allow the clamp-jaws $d\ d$ to act upon the button-hole-closing and material-clamping jaws 66. The bottom plate 52 is formed with a recess 83 on its under side, so as to pass over the plate-button L far enough to allow the last stitch of the bar to be formed.

A modification of the clamping-faces of the upper clamp-jaws and of the lower closing-jaws is shown in Figs. 18 and 19. In this case the faces are made up of a series of parallel longitudinally-extending ribs 84, each rib having a vertical wall 85 and an indirect slide 86. The ribs on the upper and lower jaws coact with each other, so that the ribs on one jaw enter the spaces between the ribs on the other jaw when the jaws are brought together. This construction of jaws holds the material very firmly and insures the proper opening and closing of the button-hole when the jaws are spread apart and swung together. This modified construction also permits the independent lateral movement of the lower clamp-jaws, but only toward each other—that is, each lower jaw can be moved independently of the upper jaws only when moved toward the guide-slot *m* in the material-carrier. To enable the lower jaws to be moved in this direction their inclined faces 86 must face the slot *m*. Then when the lower jaws are moved laterally the upper jaws will be lifted up (in case they are not elastic enough to move laterally) by the wedging action of the inclined faces 86.

I claim as my invention—

1. In a button-hole-stitching machine for stitching and barring button-holes, a material carrier and holder composed of two parts, one of which turns on and crosswise of the other when the bar is formed, substantially as set forth.

2. In a button-hole-stitching machine for stitching and barring button-holes, a material holder and carrier composed of two parts, one of which turns automatically on and crosswise of the other when the bar is formed, substantially as set forth.

3. In a button-hole-stitching machine for stitching and barring button-holes, a material carrier and holder having but a single guide-pin, said material carrier and holder being composed of two parts, one of which turns on and crosswise of the other when the bar is formed, one of said parts carrying the guide-pin and the other of said parts carrying with it the material, in combination with the feed-wheel of the machine, having a cam-groove in which said guide-pin enters, substantially as set forth.

4. In a button-hole-stitching machine for stitching and barring button-holes, a material-carrier in combination with a turning material-holder carried by and turning on and crosswise of said material-carrier when the bar is formed, substantially as set forth.

5. In a button-hole-stitching machine for stitching and barring button-holes, the feed-wheel thereof having a cam-groove, a material-carrier, and one guide-pin mounted thereon and engaging said cam-groove, in combination with a turning material-holder carried by and turning on and crosswise of said material-carrier when the bar is formed, and material-clamping devices mounted on said material-holder, substantially as set forth.

6. In a button-hole-stitching machine wherein the material is fed in a straight line while one straight side of the button-hole is being stitched, is then turned while the eye of the button-hole is being stitched, and is then fed in a straight line while the second straight side of the button-hole is being stitched, a material carrier and holder composed of two parts, one of which by means of suitable mechanism is caused to make a single quick turn on the other at the end of the second line of stitching, so as to present the button-hole slit sidewise instead of endwise of the line of feed, substantially as set forth.

7. In a button-hole-stitching machine wherein the material is fed in a straight line while one straight side of the button-hole is being stitched, is then turned while the eye of the button-hole is being stitched, and is then fed in a straight line while the second straight side of the button-hole is being stitched, the stitch-forming mechanism thereof, and a material holder and carrier composed of two parts, one of which by means of suitable mechanism is caused to make a single quick turn on the other at the end of the second line of stitching, so as to present the button-hole slit sidewise instead of endwise to the line of feed, in combination with the feeding mechanism, which feeds in the same straight line after the turn as before, but transversely with respect to the material, owing to the new position of the material holder and carrier, all substantially as set forth, whereby a bar is formed across the end of the button-hole composed of the same kind of stitches as the other button-hole stitches.

8. In a button-hole-stitching machine for stitching and barring button-holes, the reciprocating needle thereof, in combination with a material holder and carrier composed of two parts, one of which turns on the other about a center, said turning part turning when said center is substantially in line with said needle, and means for turning said turning part, substantially as set forth.

9. In a button-hole-stitching machine for stitching and barring button-holes, the reciprocating needle thereof, in combination with a material holder and carrier composed of two parts, one of which turns automatically on the other about a center, said turning part turning automatically when said center is substantially in line with said needle, and means for turning said turning part automatically, substantially as set forth.

10. In a button-hole-stitching machine for stitching and barring button-holes, the stitch-forming mechanism thereof, in combination with a material carrier and holder composed of two parts, one of which makes a single turn only on the other before the formation of the bar, said turning part completing the movement in an interval not exceeding that required for the formation of a single stitch, and means for completing said movement of said turning part in said interval, substantially as set forth.

11. In a button-hole-stitching machine for stitching and barring button-holes, the stitch-forming mechanism thereof, in combination with a material holder and carrier composed of two parts, one of which parts turns on the other, said turning part turning on the other part of the holder and carrier on a center in line with the point of the button-hole, and means for turning said turning part, substantially as set forth.

12. In a button-hole-stitching machine, a material-carrier having a curved rib thereon, in combination with a turning material-holder carried by and turning on said material-carrier, and having a curved slot longer than said curved rib and embracing the same, substantially as set forth.

13. In a button-hole-stitching machine, the bed-plate provided with a guide slot, a material-carrier moving and turning on said bed-plate, and a guide-pin on said carrier which engages said guide-slot during the entire stitching operation, in combination with a turning material-holder carried by and turning on said material-carrier, said material-holder turning on and crosswise of said material-carrier when the stitching of the second straight side of the button-hole is completed, substantially as set forth.

14. In a button-hole-stitching machine, a material-carrier, in combination with a turning material-holder carried by and turning on and crosswise of said material-carrier, and automatic shifting mechanism which turns said holder on said carrier when the stitching of the second straight side of the button-hole is completed, substantially as set forth.

15. In a button-hole-stitching machine, a material-carrier and feeding mechanism acting on the same, in combination with a turning material-holder carried by and turning on and crosswise of said material-carrier, and automatic shifting mechanism which turns said holder on said carrier when the stitching of the second straight side of the button-hole is completed and before the feeding is discontinued, substantially as set forth.

16. In a button-hole-stitching machine, a bed-plate provided with a guide-slot, a feed-wheel beneath said bed-plate provided with a cam-groove, a material-carrier moving on said bed-plate, and a guide-pin on said carrier which extends through said guide-slot and enters said cam-groove, in combination with a turning material-holder carried by and turning on and crosswise of said material-carrier, and automatic shifting mechanism which turns said holder on said carrier, substantially as set forth.

17. In a button-hole-stitching machine, a material-carrier which is fed continuously in the same right line during the stitching of the second straight side of the button-hole and during the barring of the button-hole, and feeding mechanism therefor, in combination with a turning material-holder carried by and turning on said carrier, said material-holder turning crosswise of the line of feed after the second straight side of the button-hole is stitched and before the bar is formed, and shifting mechanism for turning said material-holder, substantially as set forth.

18. In a button-hole-stitching machine, a traveling material-carrier and a turning material-holder carried by and turning on and crosswise of said material-carrier, in combination with a shifting-arm on said material-holder, and a swinging arm, into the path of which said shifting-arm is brought by the movement of said material-carrier, substantially as set forth, whereby said material-holder is turned on said material-carrier.

19. In a button-hole-stitching machine, a traveling material-carrier and a turning material-holder carried by and turning on said material-carrier, in combination with a shifting-arm on the material-holder, a swinging arm, into the path of which said shifting-arm is brought by the movement of said material-carrier, and a rotating tappet-wheel having a projecting tappet-pin, which strikes said swinging arm and swings the same, substantially as set forth.

20. In a button-hole-stitching machine, a traveling material-carrier and a turning material-holder carried by and turning on said carrier, in combination with a shifting-arm on said material-holder, having a cam-edge, a swinging arm, a rotating tappet-wheel having a tappet-pin which moves normally out of contact from said swinging arm, a stop-bar on said swinging arm, which when raised is elevated into the path of said tappet-pin, and a vertically-moving bar which raises said stop-bar, said vertically-moving bar being actuated by the cam-edge on said shifting-arm, substantially as set forth.

21. In a button-hole-stitching machine, a traveling material-carrier and a turning material-holder carried by and turning on said carrier, in combination with a shifting-arm on said material-holder, a swinging arm co-operating therewith, a rotating wheel co-operating to swing said swinging arm, and intermediate gearing between said rotating wheel and the drive-shaft of the stitching mechanism, substantially as set forth, whereby the movement of said swinging arm is timed with the movements of the stitching mechanism.

22. In a button-hole-stitching machine, a traveling material-carrier and a turning material-holder carried by and turning on said carrier, in combination with a shifting-arm on said material-holder, a swinging arm co-operating therewith, a retracting-spring connected with said swinging arm, which returns it to its state of rest, and mechanism which positively moves said swinging arm against the tension of said spring, substantially as set forth.

23. In a button-hole-stitching machine, a traveling material-carrier and a turning material-holder carried by and turning on said material-carrier, in combination with a shifting-arm on said material-holder having a cam-edge, a swinging spring-retracted arm, a constantly-rotating tappet-wheel having a projecting tappet-pin, said swinging arm having recesses to permit normally the free passage of said tappet-pin, a stop-bar pivoted to said swinging arm, which when raised closes the outer recess in said swinging arm, so that said tappet-pin encounters said stopping-bar, a lever pivoted to said swinging arm, and acting upon said stop-bar, a vertically-moving bar on said swinging bar, which when raised elevates said lever, and a striker-latch on said moving bar in the path of said shifting-arm, which is raised by the cam-edge thereof, substantially as set forth.

24. In a button-hole-stitching machine for cutting, stitching, barring, and staying button-holes, the stitching mechanism thereof, a button-hole cutter, and a traveling material-carrier, in combination with a turning material-holder carried by and turning on and crosswise of said material-carrier when the bar is formed, automatic shifting mechanism which turns said holder on said carrier, means on said holder for the attachment of a staying-cord, and feeding mechanism which acts continuously and uninterruptedly to move said material-carrier until the barring is completed, substantially as set forth, whereby by a single machine the button-hole is cut, stitched, barred, stayed, and finished.

25. In a button-hole-stitching machine for stitching, barring, and staying button-holes, the stitching mechanism thereof, and a traveling material-carrier, in combination with a turning material-holder carried by and turning on and crosswise of said material-carrier when the bar is formed, automatic shifting mechanism which turns said holder on said carrier, means on said holder for the attachment of a staying-cord, and feeding mechanism which acts continuously and uninterruptedly to move said material-carrier until the barring is completed, substantially as set forth.

26. In a button-hole-stitching machine, a material-carrier, in combination with a turning material-holder carried by and turning on said carrier, said holder being longitudinally adjustable on said carrier, substantially as set forth.

27. In a button-hole-stitching machine, a material-carrier having an adjustable curved rib thereon, said guide-rib being adjustable longitudinally on said carrier, in combination with a turning material-holder carried by and turning on said carrier, said holder having a curved slot engaging said curved rib, substantially as set forth.

28. In a button-hole-stitching machine, a material-carrier having a longitudinally-extending guide-slot and an adjustable curved rib, said curved rib being in line parallel with the line of said slot, whereby the geometric center of the arc of said rib is always coincident with a line drawn parallel with the axis of said guide-slot and extending through a vertical line passing through the part of the needle when on its instroke, in combination with a turning material-holder having a curved slot engaging said curved rib, substantially as set forth.

29. In a button-hole-stitching machine, a material-carrier having a longitudinally-extending guide-slot and an adjustable curved rib, said rib being adjustable in a line parallel with said slot, in combination with a material-holder having a curved slot engaging said curved rib, substantially as set forth.

30. In a button-hole-stitching machine, the needle thereof having an instroke and an outstroke, in combination with a material holder and carrier composed of two parts, one of which turns on the other around a center, said turning part turning when said center is coincident with a vertical line passing through the point of the needle when on its instroke, and means for turning said turning part, substantially as set forth.

31. In a button-hole-stitching machine, a material-carrier having an adjustable curved guide-rib thereon, in combination with a turning material-holder carried by and turning on said carrier, and a material-holder having a base which rests and turns on said carrier, said base being composed of two plates relatively adjustable, one of said plates supporting the material-clamping devices and the other plate having a curved slot engaging said curved guide-rib, substantially as set forth.

32. In a button-hole-stitching machine, a material-carrier having a longitudinally-extending guide-slot and a curved rib adjustable in the line of said slot, in combination with a turning material-holder carried by and turning on said carrier, said holder having a base which rests and turns on said carrier, said base being composed of two plates relatively adjustable in the line of said guide-slot in the material-carrier, the adjustment of said plates corresponding in extent with the adjustment of said curved guide-rib, one of said plates supporting the material clamping device and the other having a curved slot engaging said curved guide-rib, substantially as set forth.

33. In a button-hole-stitching machine, a traveling material-carrier and a turning material-holder carried by and turning on and crosswise of said material-carrier, in combination with a shifting-arm on said material-holder, and a swinging arm, into the path of which said shifting-arm is brought by the movement of said material-carrier, said shifting-arm and said swinging arm being relatively adjustable, substantially as set forth, whereby the point at which said material-holder turns may be varied.

34. In a button-hole-stitching machine, a traveling material-carrier and a turning material-holder carried by and turning on said material-carrier, in combination with an adjustable shifting-arm on said material-holder, and a swinging arm, into the path of which said shifting-arm is brought by the movement of said material-carrier, substantially as set forth.

35. In a button-hole-stitching machine, a traveling material-carrier and a turning material-holder carried by and turning on said material-carrier, in combination with an adjustable shifting-arm on said material-holder, said shifting-arm being adjustable in the line of the movement of said carrier, and a swinging arm, into the path of which said shifting-arm is brought by the movement of said carrier, substantially as set forth.

36. In a button-hole-stitching machine, a traveling material-carrier and a turning material-holder adjustable on said holder, and a swinging-arm, into the path of which said shifting-arm is brought by the movement of said carrier, said shifting-arm and said swinging arm being relatively adjustable, substantially as set forth.

37. In a button-hole-stitching machine, a traveling material-carrier having a curved guide-rib adjustable thereon and a turning material-holder having a base which rests and turns on said carrier, said base being composed of two plates relatively adjustable, one of said plates supporting the material-clamping devices, and the other plate having a curved slot engaging said curved rib, in combination with a shifting-arm on said material-holder, and a swinging arm co-operating therewith to turn the material-holder on the material-carrier, said shifting-arm and said swinging arm being relatively adjustable, substantially as set forth.

38. In a button-hole-stitching machine, a material-carrier having a guide-pin, in combination with a feed-wheel having a cam-groove in which said guide-pin enters, and an adjustable guide-pin lifter in said cam-groove, substantially as set forth.

39. In a button-hole-stitching machine, a material-carrier having a guide-pin, in combination with a feed-wheel having a cam-groove in which said guide-pin enters, and a guide-pin lifter in said cam-groove and adjustable therein, said guide-pin lifter having an incline, the opposite edges of which are respectively in the plane of approximately the bottom of said cam-groove and in the plane approximately of the upper surface of the feed-wheel, substantially as set forth.

40. In a button-hole-stitching machine, a material-carrier having a guide-pin, in combination with a feed-wheel having a cam-groove in which said guide-pin enters, and a guide-pin lifter adjustable in said cam-groove, said lifter having an incline extending from the plane approximately of the bottom of said cam-groove to that of the upper surface of the feed-wheel, and having a platform extending from the upper edge of said incline and in the plane of the upper surface of the feed-wheel, substantially as set forth.

41. In a button-hole-stitching machine, a material-carrier having a guide-pin, in combination with a feed-wheel having a cam-groove in which said guide-pin enters, and a guide-pin lifter adjustable in and along said cam-groove, said lifter having an expansible and contractible end, substantially as set forth, whereby it may bind against the side walls of the cam-groove.

42. In a button-hole-stitching machine, a material-carrier having a guide-pin, in combination with a feed-wheel having a cam-groove in which said guide-pin enters, a guide-pin lifter adjustable in and along said cam-groove, said guide-pin lifter having one end split, and a wedging-screw entering between the two parts of said split ends, substantially as set forth.

43. In a button-hole-stitching machine, a material-carrier, in combination with button-hole-closing jaws on said carrier on which the material is held, substantially as set forth.

44. In a button-hole-stitching machine, a material-carrier, in combination with button-hole-closing jaws on said carrier, which swing to and from each other, and a material-clamp which clamps the material upon said jaws, substantially as set forth.

45. In a button-hole-stitching machine, a material-carrier, in combination with button-hole-closing jaws on said carrier, which swing to and from each other, a material-clamp which clamps the material upon said jaws, and automatically-acting mechanism which moves said jaws to and from each other, substantially as set forth.

46. In a button-hole-stitching machine, a material-carrier, in combination with button-hole-closing jaws on said carrier, which swing to and from each other, material-clamping jaws which clamp the material against said jaws, respectively, and a spreader which spreads said clamping-jaws apart to open the button-hole, substantially as set forth.

47. In a button-hole-stitching machine, a material-carrier and a turning material-holder carried by and turning on said carrier, in combination with button-hole-closing jaws pivoted to said material-holder, and means for swinging said jaws together when said material-holder turns on said carrier, substantially as set forth.

48. In a button-hole-stitching machine, a material-carrier and a turning material-holder carried by and turning on said carrier, in combination with button-hole-closing jaws pivoted to said material-holder, cam-studs fixed to said material-carrier, and cam-blades pivoted to said material-holder and engaging said button-hole-closing jaws, said cam-blades having cam-slots embracing said fixed cam-studs, substantially as set forth, whereby when said material-holder turns said button-hole jaws will be turned on their pivots.

49. In a button-hole-stitching machine, a material-carrier, a turning material-holder carried by and turning on said material-carrier, and mechanism which automatically turns said holder, in combination with button-hole-closing jaws having slots therein and pivoted to said material-holder, cam-blades pivoted to said material-holder above said jaws, having pins entering the slots in said jaws and themselves having cam-slots, and cam-studs fixed to the material-carrier and entering said cam-slots, substantially as set forth.

50. In a button-hole-stitching machine, upper and lower material-clamping jaws, said jaws having longitudinally-extending projecting clamping-ribs, the ribs on one jaw being located opposite the spaces between the ribs on the other jaws, and said lower jaws being laterally movable toward each other independently of said upper jaws, substantially as set forth.

51. In a button-hole-stitching machine, upper and lower material-clamping jaws, each of the upper jaws having longitudinally-extending projecting ribs on its outer edges and separated from each other and each of the lower jaws having a single central longitudinally-extending projecting rib movable between said ribs on the upper jaw, substantially as set forth.

52. In a button-hole-stitching machine, a material-carrier and a guide-pin carried thereby, in combination with a material-holder turning on said carrier, the material-clamp post and bracket on said holder only partly encircling and extending over said guide-pin, substantially as set forth.

In witness whereof I have hereunto signed my name in the presence of two subscribing witnesses.

JOHN Q. A. HOUGHTON.

Witnesses:
G. W. S. MUSGRAVE,
W. A. WRIGHT.